United States Patent
Ito

(10) Patent No.: US 10,259,269 B2
(45) Date of Patent: Apr. 16, 2019

(54) PNEUMATIC TIRE FOR MOTORCYCLE

(71) Applicant: BRIDGESTONE CORPORATION, Tokyo (JP)

(72) Inventor: Masafumi Ito, Kokubunji (JP)

(73) Assignee: BRIDGESTONE CORPORATION, Tokyo (JP)

( * ) Notice: Subject to any disclaimer, the term of this patent is extended or adjusted under 35 U.S.C. 154(b) by 227 days.

(21) Appl. No.: 14/761,478

(22) PCT Filed: Jan. 16, 2014

(86) PCT No.: PCT/JP2014/000196
§ 371 (c)(1),
(2) Date: Jul. 16, 2015

(87) PCT Pub. No.: WO2014/122885
PCT Pub. Date: Aug. 14, 2014

(65) Prior Publication Data
US 2015/0360520 A1  Dec. 17, 2015

(30) Foreign Application Priority Data

Feb. 8, 2013 (JP) .................................. 2013-023700

(51) Int. Cl.
*B60C 13/00* (2006.01)
*B60C 13/02* (2006.01)
(Continued)

(52) U.S. Cl.
CPC ................ *B60C 13/02* (2013.01); *B60C 9/08* (2013.01); *B60C 11/11* (2013.01);
(Continued)

(58) Field of Classification Search
CPC .. B60C 13/02; B60C 2200/10; B60C 2200/14
(Continued)

(56) References Cited

U.S. PATENT DOCUMENTS

| | | | |
|---|---|---|---|
| 4,757,850 A * | 7/1988 | Nakasaki | ............ B60C 11/0309 152/209.11 |
| 2010/0193101 A1* | 8/2010 | Miyasaka | ............... B60C 13/02 152/523 |

(Continued)

FOREIGN PATENT DOCUMENTS

| CN | 101765523 A | 6/2010 |
|---|---|---|
| CN | 101909907 A | 12/2010 |

(Continued)

OTHER PUBLICATIONS

Machine Translation: JP 2010163144 A; Nakamura, Kazumi; no date.*

(Continued)

*Primary Examiner* — Kendra Ly
(74) *Attorney, Agent, or Firm* — Sughrue Mion, PLLC

(57) ABSTRACT

A motorcycle pneumatic tire for travelling over rough terrain, wherein: the tire has a plurality of fin-like projections provided in the tire circumferential direction with intervals therebetween in an outer surface of the sidewall portion such that the fin-like projections each protrude from the outer surface and extend in the tire radial direction; a surface of at least the end portion on the outer side in the tire radial direction of each fin-like projection is formed to have an arcuate configuration protruding toward the tire inner surface side in a cross section in the width direction of the tire; and the arcuate surface of the end portion on the outer side in the tire radial direction of the fin-like projection is smoothly connected to an outer side surface of a shoulder block provided on the outermost side in the tire width direction of the tread portion.

7 Claims, 2 Drawing Sheets

(51) Int. Cl.
*B60C 11/01* (2006.01)
*B60C 11/11* (2006.01)
*B60C 9/08* (2006.01)
*B60C 15/00* (2006.01)
*B29D 30/06* (2006.01)
*B29D 30/72* (2006.01)

(52) U.S. Cl.
CPC .. *B60C 15/0036* (2013.01); *B29D 2030/0616* (2013.01); *B29D 2030/724* (2013.01); *B60C 11/01* (2013.01); *B60C 2200/10* (2013.01); *B60C 2200/14* (2013.01)

(58) Field of Classification Search
USPC .................................................. 152/209.11
See application file for complete search history.

(56) References Cited

U.S. PATENT DOCUMENTS

| | | | | |
|---|---|---|---|---|
| 2010/0288409 | A1* | 11/2010 | Ohara | B60C 13/02 152/209.11 |
| 2010/0314019 | A1* | 12/2010 | Noda | B60C 5/142 152/556 |
| 2012/0006460 | A1 | 1/2012 | Takano | |
| 2012/0312436 | A1* | 12/2012 | Hikita | B60C 15/0603 152/209.1 |

FOREIGN PATENT DOCUMENTS

| | | | |
|---|---|---|---|
| CN | 102026830 | A | 4/2011 |
| EP | 2177377 | A1 | 4/2010 |
| JP | 6-234309 | A | 8/1994 |
| JP | 10-907 | A | 1/1998 |
| JP | 2006-256355 | A | 9/2006 |
| JP | 2008247193 | A * | 10/2008 |
| JP | 2009-29384 | A | 2/2009 |
| JP | 2010-163144 | A | 7/2010 |
| JP | 2010163144 | A * | 7/2010 |
| JP | 2010-167832 | A | 8/2010 |
| JP | 2012-17069 | A | 1/2012 |
| JP | 2012-41026 | A | 3/2012 |
| JP | 2012-206669 | A | 10/2012 |
| WO | 2007/032405 | A1 | 3/2007 |

OTHER PUBLICATIONS

Machine Translation: JP-2008247193-A; Nakamura, Kazumi; (Year: 2018).*
Japanese Office Action for JP 2013-023700 dated Jan. 14, 2014.
International Search Report for PCT/JP2014/000196 dated Feb. 10, 2014.

* cited by examiner

PNEUMATIC TIRE FOR MOTORCYCLE

CROSS REFERENCE TO RELATED APPLICATIONS

This application is a National Stage of International Application No. PCT/JP2014/000196 filed Jan. 16, 2014, claiming priority based on Japanese Patent Application No. 2013-023700 filed Feb. 8, 2013, the contents of all of which are incorporated herein by reference in their entirety.

TECHNICAL FIELD

The present invention relates to a motorcycle pneumatic tire for travelling over rough terrain.

BACKGROUND ART

A pneumatic tire for a motorcycle, mainly used in rough terrain including a swampy ground for competitions such as motocross, enduro races and the like, is subjected to relatively large deformation, as compared with tires for a paved road in general, because the former serves for traveling on a rough terrain surface having ruts and irregular projections/dents made by other vehicles.

Further, the tire of this kind is generally used in a state where the tire has been inflated at relatively low internal pressure, as compared with other tires in general, so that the tire can demonstrate good fraction and gripping performances with respect to the rough terrain surface. Consequently, deformation of sidewall portions susceptible to low internal pressure of the tire is intensified and internal temperature in the sidewall portions increases, such that the rise in temperature reduces rigidity in the sidewall portion and thus further facilitates deformation of the sidewall portion, which then further raises the internal temperature in the sidewall portions, i.e. creates a vicious circle of more deformation caused by higher temperature. Controllability and stability of the tire tends to deteriorate over time during use thereof, accordingly.

In this connection, PTL 1, although it does not relate to a pneumatic tire for a motorcycle as described above, discloses a run-flat tire having a crescent-shaped side-reinforcing rubber in a side portion thereof, wherein the tire comprises "recessed and protruded parts for generating air turbulences, constituted of grooves and projections and formed to extend in at least a part of a tire side portion", for decreasing temperature in the tire side portion.

CITATION LIST

Patent Literature

PTL 1: WO2007/032405

SUMMARY

However, when an outer surface of a sidewall portion of the aforementioned motorcycle tire, which tire is likely to be used in rough terrain, is provided with the "recessed and protruded" configurations according to the technique described in PTL 1, the recessed and protruded configurations locally provided in the outer surface of the sidewall portion susceptible to deformation in running on rough terrain, of the tire, tend to serve as starting points of cracks which may grow in the outer surface of the sidewall portion. That is, the recessed and protruded configurations according to PTL 1, directly introduced to the aforementioned motorcycle tire for off-road travelling, causes a problem in that the configurations may deteriorate durability of a sidewall of the tire, although they somehow facilitate heat dissipation the sidewall portion.

In view of the problem described above, a motorcycle pneumatic tire of the present disclosure is a tire for travelling over rough terrain, having a pair of bead portions, sidewall portions respectively continuous with the bead portions and extending in the tire radial direction, and a tread portion continuous with the respective sidewall portions, wherein: the tire has a plurality of fin-like projections provided in the tire circumferential direction with intervals therebetween in an outer surface of the sidewall portion such that the fin-like projections each protrude from the outer surface and extend in the tire radial direction; each fin-like projection has an end portion on the inner side in the tire radial direction and an end portion in the outer side in the tire radial direction, and a surface of at least the end portion on the outer side in the tire radial direction is formed to have an arcuate configuration protruding toward the tire inner surface side in a cross section in the width direction of the tire; and the arcuate surface of the end portion on the outer side in the tire radial direction of the fin-like projection is smoothly connected to an outer side surface of a shoulder block provided on the outermost side in the tire width direction of the tread portion.

The tire can well suppress a rise in internal temperature of a sidewall portion of a tire and thus a decrease in rigidity of the sidewall portion, while maintaining good durability of the sidewall portion, thereby successfully exhibiting good controllability and stability performance over a long period.

DETAILED DESCRIPTION

An embodiment of our motorcycle pneumatic tire will be demonstratively described hereinafter with reference to the drawings.

Figure 1:
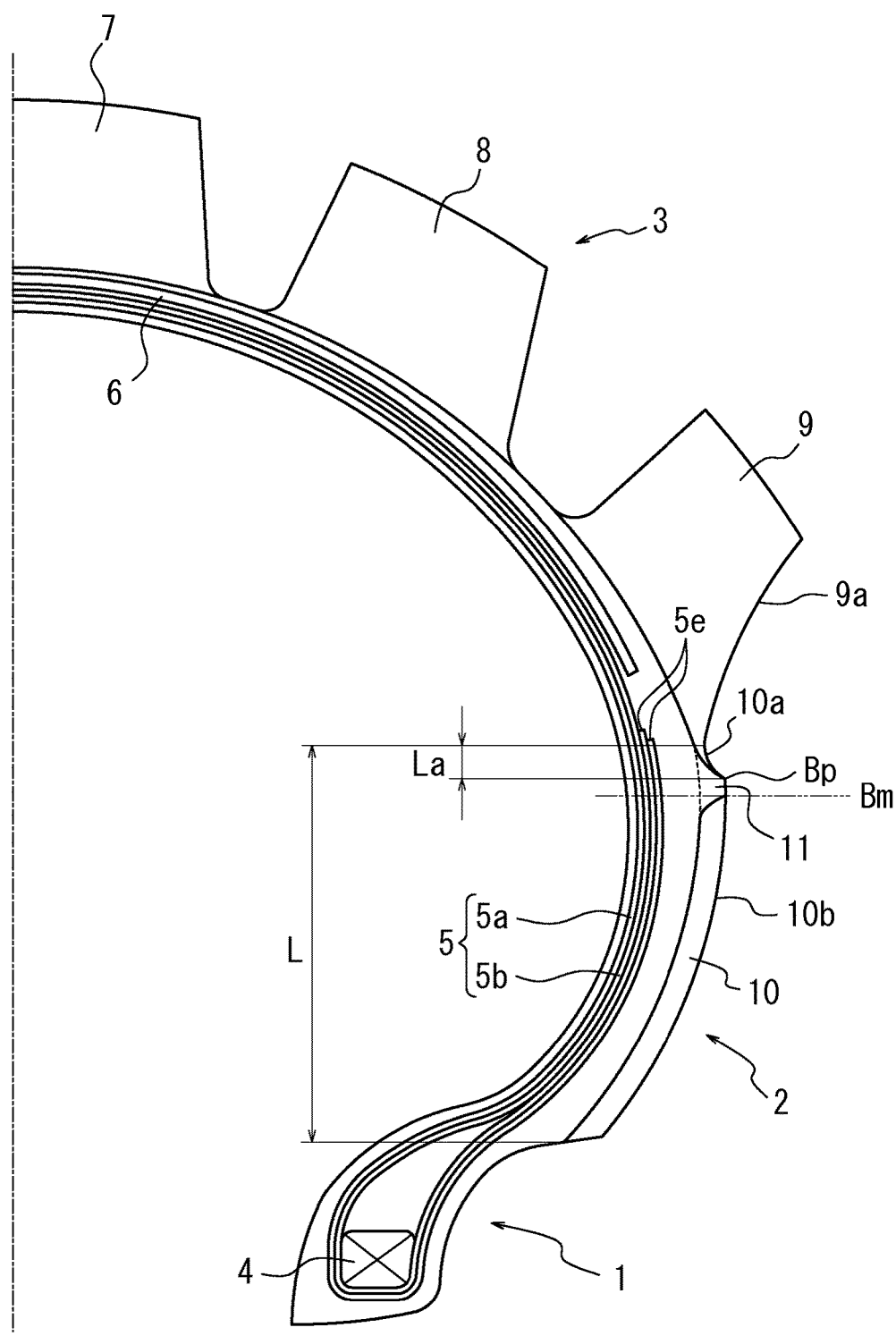
FIG. 1 is a cross sectional view in the tire width direction, showing a half portion of a motorcycle pneumatic tire according to an embodiment of our motorcycle pneumatic tire.

A pneumatic tire for a motorcycle, shown in FIG. 1, mainly serves for running on rough terrain including a swampy ground and has a pair of bead portions 1, sidewall portions 2 respectively continuous with the bead portions 1 and extending in the tire radial direction, and a tread portion 3 continuous with the respective sidewall portions 2.

The tire shown in FIG. 1 further has: bead cores 4 respectively provided in the pair of bead portions 1; at least one (two in the drawing) carcass ply 5a, 5b extending from the tread portion 3 via the respective sidewall portions 2 to the bead portions 1 and being turned up around the respective bead cores 4; and a belt 6 constituted of, for example, a single belt layer and provided on the outer peripheral side of a crown region, i.e. on the outer side in the tire radial direction, of the carcass ply 5a, 5b.

The carcass ply 5a, 5b, constituted of a plurality of cords made of organic fibers, steel, or other materials, may have a radial structure in which the cords extend substantially in the tire width direction at an inclination angle in the range of 70° to 90° with respect to the tire circumferential direction.

Alternatively, the two carcass plies 5a, 5b adjacent to each other in the tire radial direction may collectively form a bias structure in which the cords thereof are inclined an angle in the range of 20° to 40° with respect to the tire circumferential direction and the cords of one carcass ply and the cords of the other carcass ply extend in opposite directions with respect to the tire circumferential direction.

The single belt layer (or each of the belt layers) of the belt 6 is formed of at least one organic fiber cord or steel cord extending at a predetermined angle with respect to the tire circumferential direction. In a case where the belt is constituted of a plurality of belt layers adjacent to each other in the radial direction, the cords of one belt layer and the cords of another belt layer adjacent to the one belt layer may extend in opposite directions alternately with respect to the tire circumferential direction.

A plurality of blocks 7, 8, 9, causing the tire to exhibit fraction performance and gripping performance as required with respect to a road surface when a motorcycle runs, are provided in the tire circumferential direction and/or the tire width direction, for example, with necessary intervals therebetween in the tread portion 3 which is brought into contact with the road surface on the outer peripheral side of the belt 6.

The sidewall portions 2 of the motorcycle pneumatic tire for travelling over rough terrain as described above may be subjected to significant bending deformation, depending on a state of a road surface on which the tire travels and how the tire is used. A rise in internal temperature resulted from the bending deformation of the sidewall portion 2 may decrease rigidity of the sidewall portion over time and deteriorate controllability and stability of the tire as the use of the tire continues. In view of this, in our motorcycle pneumatic tire, a plurality of fin-like projections 10 are provided in the tire circumferential direction C with intervals therebetween in an outer surface of the sidewall portion 2 such that the projections 10 each protrude from the outer surface and extend, e.g. linearly in the tire radial direction R, as shown in the partially enlarged perspective view of FIG. 2, in order to facilitate effective heat dissipation in the sidewall portion 2.

The fin-like projections 10 generate air turbulences in the vicinity of the outer surface of the sidewall 2 and thus function as means for cooling the sidewall portion 2 with air when the tire runs and is rotated. Specifically, air in the vicinity of the outer surface of the sidewall portion 2 flows over the respective fin-like projections 10 each protruding from the outer surface and extending in the tire radial direction, swirls cold air above the outer surface of the sidewall 2, and flows with the cold air thus swirled therein into outer surface 2 portions between the respective two fin-like projections 10 adjacent to each other in the tire circumferential direction, thereby cooling the outer surface portions and thus facilitating heat dissipation from the outer surface of the sidewall portion 2.

In this connection, provided that: h represents the maximum protruding height, along a line normal to the outer surface of the sidewall 2, of the fin-like projection 10; p represents a pitch at which the fin-like projections 10 are provided in the tire circumferential direction; and w represents the maximum width in the tire circumferential direction of the fin-like projection 10, it is preferable that $1 \leq p/h \leq 20$ and $1 \leq (p-w)/w \leq 50$ in terms of more effectively cooling the sidewall portion 2 with air by the fin-like projections 10 to further effectively suppress a rise in internal temperature of the sidewall portion 2. The pitch p is to be measured at the center position in the tire radial direction of each fin-like configuration 10.

More specifically, the fin-like projections 10 may each have the maximum protruding height h in the range of 1 mm to 3 mm and the width w in the range of 1 mm to 2 min and the number thereof provided in the tire circumferential direction may be in the range of 40 to 80. In the tire exemplarily shown in FIG. 1, in particular, the protruding height h of each fin-like projection 10 is 2 mm over the entire length thereof, the number of the fin-like projections 10 is 52, and the width w of each fin-like projection is 1.5 mm over the entire length thereof.

Figure 2:
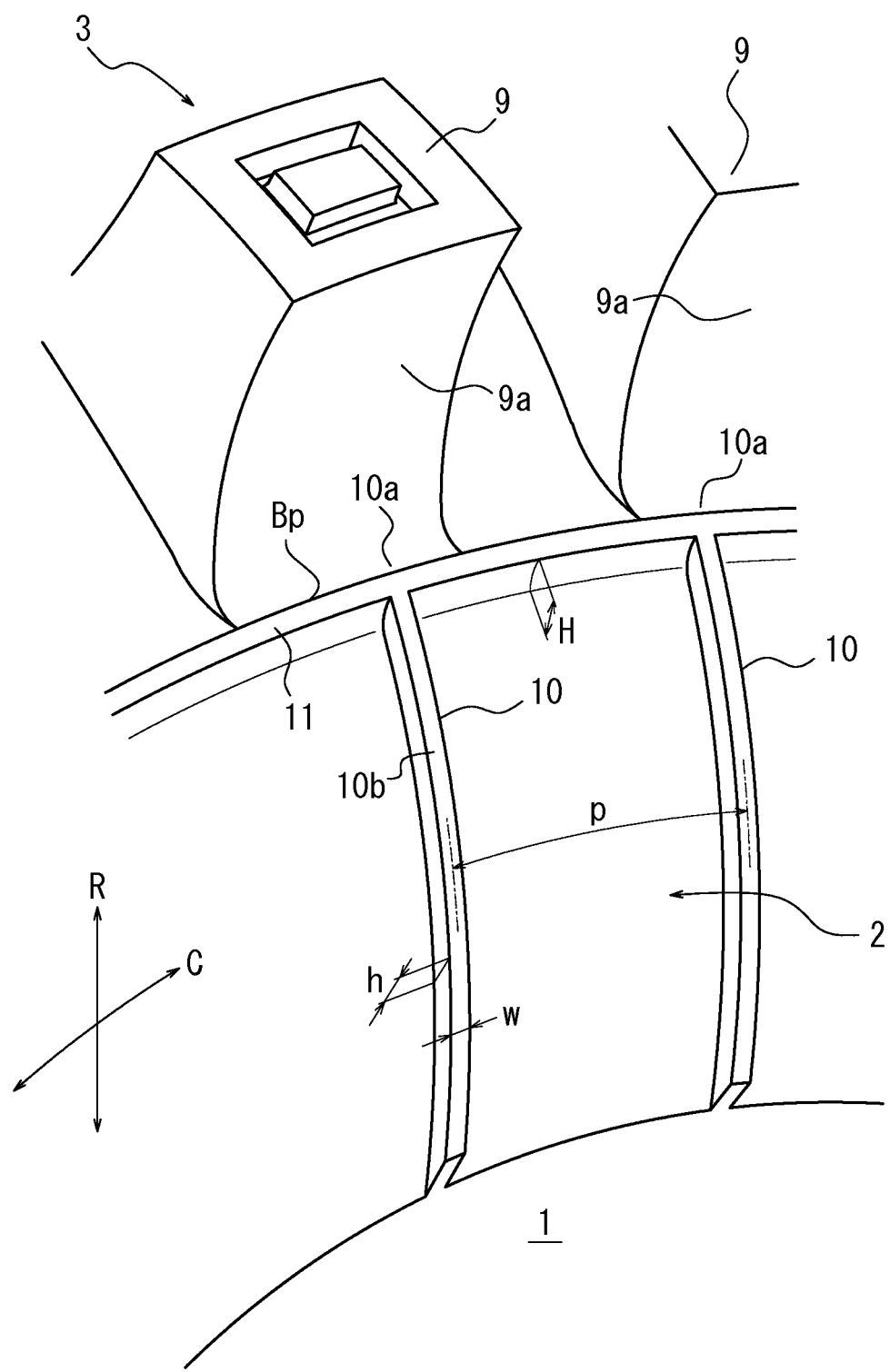
FIG. 2 is a partially enlarged perspective view showing an outer surface of a sidewall portion of the tire of FIG. 1.

It is preferable that the fin-like projection 10 extends linearly in the tire radial direction, as shown in FIG. 1 and FIG. 2, in terms of causing the air-cooling effect thereof in a satisfactory manner. However, the fin-like projection 10 may extend to be inclined at an angle of $\leq 30°$ with respect to the tire radial direction and/or bend or curve in at least a portion thereof, although not shown in the drawings.

The fin-like projection 10 extends from the inner end portion in the tire radial direction of the shoulder block 9 to a rim line position, i.e. over the entire length in the tire radial direction of the sidewall portion 2, in the example shown in FIGS. 1 and 2. However, a length equivalent to at least 30% of the length along the tire radial direction of the sidewall portion 2 in a state where the tire has been assembled with a prescribed rim and inflated at the normal internal pressure suffices as a length L along the tire radial direction of the fin-like projection 10 in terms of dissipating heat of the sidewall portion 2 in a satisfactorily effective manner.

There is a possibility that cracks are generated in the outer surface of the sidewall portion 2 as the use of the tire continues, and provision of the fin-like projections 10 as described above in the outer surface of the sidewall portion 2 may facilitate growth of cracks along the fin-like configurations 10 at the outer end portion 10a in the tire radial direction thereof in particular, thereby deteriorating durability of the sidewall portion 2.

In view of this, of an end portion on the inner side in the tire radial direction and an end portion on the outer side in the tire radial direction of each fin-like projection 10, a surface, facing the outer side in the tire radial direction, of at least the end portion 10a on the outer side in the tire radial direction is formed to have an arcuate configuration protruding toward the tire inner surface side in a cross section in the tire width direction, as shown in FIG. 1; and the arcuate surface of the end portion 10a on the outer side in the tire radial direction is smoothly connected to an outer side surface 9a, facing the outer side in the tire width direction, of the shoulder block 9 provided on the outermost side in the tire width direction of the tread portion 3 (among the plurality of blocks 7 to 9 provided in the tread portion 3) in our motorcycle pneumatic tire.

Accordingly, the outer end portion 10a in the tire radial direction thus having an arcuate surface configuration in a cross section in the tire width direction, of each fin-like projection 10, absorbs strains generated in the vicinity of the outer end portion 10a in the tire radial direction of the fin-like projection 10, so that further growth of cracks generated in the vanity of the outer end portion 10a can be prevented by the arcuate surface of the outer end portion 10a.

The outer end portions in the tire width direction of the shoulder blocks 9 and the outer end portions 10a in the tire radial direction of the fin-like projections 10 densely reside in a borderline region between the tread portion 3 and the sidewall portion 2, thereby facilitating occurrence of cracks in the borderline region. However, the number of potential crack-starting sites due to the aforementioned high density of the end portions, i.e. a possibility of crack generation, can be effectively reduced by smoothly connecting the arcuate surface of the end portion 10a on the outer side in the tire radial direction of each fin-like projection 10 to the outer side surface 9a of the corresponding shoulder block 9 in the present embodiment.

An annularly protruding side portion 11 is provided in a region, adjacent to the shoulder block 9, of the outer surface of the sidewall 2 such that the annularly protruding side portion 11 protrudes from the outer surface and has a protruding height H equal to the aforementioned protruding height h of the fin-like projection 10 in the present embodiment shown in the drawings. The respective fin-like projections 10 are integrally connected to the annularly protruding side portion 11 such that the arcuate surface of the end portion 10a on the outer side in the tire radial direction of each fin-like projection 10 constitutes a part of a surface, facing the outer side in the tire radial direction, of the annularly protruding side portion 11.

Linking the end portions 10a on the outer side in the tire radial direction of the fin-like projections 10 by the annularly protruding side portion 11 as described above is preferable because stress concentrated on some of the outer ends 10a in the tire radial direction of the fin-like projections 10 can be dispersed in the tire circumferential direction by the annularly protruding side portion 11 linking the outer ends 10a in the tire radial direction of the fin-like projections 10, whereby crack generation there can be further effectively prevented.

In this connection, the protruding height h of the fin-like projection 10 may differ from the protruding height H of the annularly protruding side portion 11 at a site where the fin-like projection 10 is connected to the annularly protruding side portion 11 (not shown in the drawings).

Turned-up ends 5e of the carcass plies 5a, 5b turned up around each bead core 4 from the inner side toward the outer side in the tire width direction are preferably positioned on the outer side in the tire radial direction of a corresponding borderline Bp between the arcuate surface of the end portion 10a on the outer side in the tire radial direction of the fin-like projection 10 and a protruding surface 10b (protruding in parallel to the outer surface of the sidewall portion 2 in the example shown in the drawings) of the fin-like projection 10, as shown in FIG. 1. According to this structure, i) the carcass plies 5a, 5b are turned up to a relatively high position on the outer side in the tire radial direction, whereby it is possible to increase rigidity of the sidewall portions 2 and thus reduce strains affecting the outer surfaces of the sidewall portions 2 and ii) the turned-up ends 5e, subjected to relatively large strains, of the carcass plies 5a, 5b are shifted in the tire radial direction from the corresponding borderline Bp between the arcuate surface of the outer end portion 10a in the tire radial direction and the protruding surface 10b of each fin-like projection 10, whereby it is possible to further effectively prevent crack generation in the outer surfaces of the sidewall portions 2. In a case where two or more carcass plies 5a, 5b are provided as in the tire shown in the drawings, it is particularly preferable that the turned-up ends 5e of the carcass plies 5a, 5b are each positioned on the outer side in the tire radial direction of the corresponding borderline Bp.

A vulcanization-molding process for manufacturing our motorcycle pneumatic tire may use a vulcanization mold (not shown in the drawings) constituted, for example, of: a tread mold for forming the tread portion 3, which has an inner surface configuration corresponding to the outer surface configuration of the tread portion 3 and includes a plurality of segments which can be divided in the circumferential direction; and upper and lower side molds for forming the sidewall portions 2 and the bead portions 1, which have inner surface configurations corresponding to the outer surface configurations of the sidewall portions 2 and the bead portions 1, respectively.

In a case where a tire is vulcanization-molded by using the vulcanization mold as described above, stress tends to concentrate in the tire thus manufactured, when the tire is used, at a tire outer surface position thereof corresponding to a borderline position Bm (indicated by a phantom line in FIG. 1) between the tread mold and the side molds of the vulcanization mold in a clamped state. In view of this, it is preferable in a cross sectional view in the width direction of the tire that the borderline position Bm (or the tire outer surface position corresponding to the borderline position Bm) is positioned on the inner side in the tire radial direction than the borderline Bp between the arcuate surface of the outer end portion 10a in the tire radial direction of the fin-like projection 10 and the protruding surface 10b of the fin-like projection 10. According to this arrangement, it is possible to effectively prevent stress from concentrating at the arcuate surfaces of the fin-like projections 10 (stress would concentrate at the arcuate surfaces of the fin-like projections 10 if the borderline position Bm between the tread mold and the side molds were to be positioned at the arcuate surfaces of the fin-like projections 10). It is particularly preferable that the borderline position Bm of the molds is positioned at the protruding surface 10b of the fin-like projection 10 as in the present embodiment shown in the cross sectional view of FIG. 1 in terms of effectively preventing stress from concentrating at the arcuate surfaces of the fin-like projections 10.

A side reinforcing layer (not shown in the drawings) having cords made of organic fiber, steel, or the like is preferably provided on the inner side in the tire width direction of the fin-like projections 10 inside the sidewall portion 2 such that the cords extend to be inclined with respect to the tire radial direction. Provision of the side reinforcing layer enhances rigidity of the sidewall portion 2 and reduces strains affecting the outer surface thereof, thereby effectively preventing crack generation in the outer surface as described above. The side reinforcing layer is preferably provided on the outer side in the tire width direction of the carcass plies 5a, 5b.

Examples

Test tires of our motorcycle pneumatic tires for travelling over rough terrain were prepared and performances thereof were evaluated as described below. The test tires each having a bias structure were prepared for two sizes: 120/80-19 and 110/90-19. More specifically, each test tire had a bias structure including two carcass plies and a layer of breaker made of nylon cords provided on the outer peripheral side of the carcass plies.

Example 1 tire (for each size) had the structure as shown in FIGS. 1 and 2. Comparative Example 1 tire (for each size) had the same structure as Example 1 tire, except that, although the former somehow had fin-like projections thereon, the outer ends in the tire radial direction of the fin-like projections thereof were not smoothly connected to outer side surfaces of shoulder blocks (i.e. the fin-like projections each terminated by a plane orthogonal to the extending direction thereof). Comparative Example 2 tire (for each size) had the same structure as Example 1 tire, except that the former lacked any fin-like projections provided on the outer surfaces of the sidewalls. Each of the test tires was made to run on a course specified for motocross competitions by a professional motocross rider. Controllability and stability performance, as well as how the controllability and stability performance was maintained after running for a predetermined time, was determined for the test tire by sensory evaluation by the motocross rider and the evaluation results were expressed by points (10 was the full marks). Further, presence/absence of crack generation in the outer surfaces of the sidewall portions after the running was examined for the test tire. These evaluation results, as well as the relevant characteristics, of the respective test tires are shown in Table 1 in a summarized manner.

TABLE 1

|  |  | Example 1 tire | Comp. Example 1 tire | Comp. Example 2 tire |
| --- | --- | --- | --- | --- |
| Presence/absence of fin-like projection |  | Present | Present | Absent |
| Connection state of fin-like projection with outer side surface of shoulder block |  | Smooth | Not smooth | — |
| Protruding height h (mm) of fin-like projection |  | 2 | 2 | — |
| Number of fin-like projections |  | 52 | 52 | — |
| Width w (mm) of fin-like projection |  | 1.5 | 1.5 | — |
| Evaluation results | Controllability and stability performance | 8 | 8 | 7 |
|  | Generation of cracks | Not observed | Observed | — |

It is understood from the results shown in Table 1 that, because of provision of the fin (rib)-like projections, controllability and stability performance does not deteriorate in Example 1 tire and Comparative Example 1 tire as in Comparative Example 2. Further, comparing Example 1 tire, in which a surface of the end portion on the outer side in the tire radial direction of each fin-like projection is formed to have an arcuate configuration protruding toward the tire inner surface side in a cross section in the tire width direction; and the arcuate surface of the end portion on the outer side in the tire radial direction is smoothly connected to an outer side surface of shoulder block, with Comparative Example 1 tire where a surface of the end portion on the outer side in the tire radial direction of each fin-like projection is neither formed to have an arcuate configuration nor smoothly connected to an outer side surface of shoulder block, Example 1 tire exhibited no cracks generated in the outer surfaces of the sidewalls but Comparative Example 1 tire exhibited cracks in the outer surfaces of the sidewalls. It is therefore obvious that, our motorcycle pneumatic tire for travelling over rough terrain can exhibit good controllability and stability performance over a long period, while maintaining good durability of the sidewall portion.

REFERENCE SIGNS LIST

1 Bead portion
2 Sidewall portion
3 Tread portion
4 Bead core
5a, 5b Carcass ply
5e Turned-up end of carcass ply
6 Belt
7, 8 Block
9 Shoulder block
9a Outer side surface of shoulder block
10 Fin-like projection
10a End portion on the outer side in the tire radial direction of fin-like projection
10b Protruding surface of fin-like projection
11 Annularly protruding side portion
Bp Borderline between arcuate surface of the outer end portion in the tire radial direction and protruding surface of fin-like projection
Bm Borderline position between tread mold and side molds
L Length along the tire radial direction of fin-like projection
La Length along the tire radial direction of radially outer end of fin-like projection
P Pitch at which fin-like projections are provided in the tire circumferential direction
h Protruding height of fin-like projection
w Width in the tire circumferential direction of fin-like projection
H Protruding height of annularly protruding side portion

The invention claimed is:
1. A motorcycle pneumatic tire for travelling over rough terrain, comprising:
a pair of bead portions, sidewall portions respectively continuous with the bead portions and extending in a tire radial direction, and a tread portion continuous with the sidewall portions;
bead cores respectively embedded in the pair of bead portions;
at least one carcass ply extending from the tread portion via the sidewall portions to the bead portions and including turned-up portions turned up around the respective bead cores;
a belt provided on an outer peripheral side of a crown region of the at least one carcass ply: and
a plurality of fin-like projections provided along a tire circumferential direction with intervals therebetween on an outer surface of each of the sidewall portions such that the fin-like projections each protrude from the outer surface and extend in the tire radial direction;
wherein each fin-like projection has an end portion on an inner side in the tire radial direction and an end portion on an outer side in the tire radial direction, and a surface of at least the end portion on the outer side in the tire radial direction is formed to be an arcuate surface protruding toward the tire inner surface side in a cross section in a width direction of the tire;
wherein the arcuate surface of the end portion on the outer side in the tire radial direction of the fin-like projection is smoothly connected to a tire width direction outer side surface of a shoulder block provided on the outermost side in the tire width direction of the tread portion;

wherein an annularly protruding side portion is provided in a region, adjacent to the shoulder block, of the outer surface of the sidewall such that the annularly protruding side portion protrudes from the outer surface, and the respective end portions on the outer side in the tire radial direction of the fin-like projections are linked by the annularly protruding side portion;

wherein the tire width direction outer side surface of the shoulder block is free of the fin-like projections, and wherein the turned-up portions are separated from the belt with no overlapping therebetween.

2. The motorcycle pneumatic tire of claim 1, wherein:
the tire further comprises
a turned-up end of the carcass ply positioned in the cross section of the tire in the width direction thereof, on the outer side in the tire radial direction of a borderline between the arcuate surface of the end portion on the outer side in the tire radial direction of the fin-like projection and a protruding surface of the fin-like projection.

3. The motorcycle pneumatic tire of claim 1, further comprising a side reinforcing layer having cords provided on the inner side in the tire width direction of the fin-like projections inside the sidewall portion such that the cords extend to be inclined with respect to the tire radial direction.

4. The motorcycle pneumatic tire of claim 1, wherein a portion of an arcuate surface of the outer end in the tire radial direction of the annularly protruding side portion, which portion is between two tire width direction outermost shoulder blocks, is connected to a lug groove of the tread portion and has a larger curvature than a curvature of the arcuate surface of the end portion on the outer side in the tire radial direction of the fin-like projection smoothly connected to the outer side surface of the shoulder block.

5. The motorcycle pneumatic tire of claim 1, wherein a length (L) along the tire radial direction of the fin-like projection is at least 30% of the length along the tire radial direction of the sidewall portion in a state where the tire has been assembled with a prescribed rim and inflated at a normal internal pressure.

6. The motorcycle pneumatic tire of claim 1, wherein the outermost end in the tire width direction of the outermost shoulder block is positioned on the outer side of the outermost end in the tire width direction of the annularly protruding side portion in the cross section.

7. The motorcycle pneumatic tire of claim 1, wherein a height of the annularly protruding side portion is in a range of 1 mm to 3 mm.

* * * * *